United States Patent
Le et al.

(10) Patent No.: US 10,536,537 B1
(45) Date of Patent: Jan. 14, 2020

(54) MULTI-SOURCE DETERMINISTIC ORACLE MANAGEMENT

(71) Applicant: Accenture Global Solutions Limited, Dublin (IE)

(72) Inventors: Anh-Dung Le, Antibes (FR); Luca Schiatti, Juan-les-Pins (FR); Giuseppe Giordano, Juan-les-Pins (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/440,510

(22) Filed: Jun. 13, 2019

(51) Int. Cl.
| | | |
|---|---|---|
| *H04L 29/08* | (2006.01) | |
| *H04L 9/30* | (2006.01) | |
| *G06F 16/182* | (2019.01) | |
| *H04L 9/32* | (2006.01) | |
| *G06Q 20/38* | (2012.01) | |

(52) U.S. Cl.
CPC .......... *H04L 67/16* (2013.01); *G06F 16/1824* (2019.01); *G06Q 20/3829* (2013.01); *H04L 9/30* (2013.01); *H04L 9/3247* (2013.01); *H04L 2209/38* (2013.01)

(58) Field of Classification Search
CPC ......... H04L 67/16; H04L 9/30; H04L 9/3247; H04L 2209/38; G06F 16/1824; G06Q 20/3829
See application file for complete search history.

(56) References Cited

U.S. PATENT DOCUMENTS

| | | | |
|---|---|---|---|
| 9,992,022 B1* | 6/2018 | Chapman | H04L 63/0861 |
| 10,250,394 B1* | 4/2019 | Borne-Pons | H04L 9/3247 |
| 10,250,395 B1* | 4/2019 | Borne-Pons | H04L 9/3239 |
| 10,341,121 B2* | 7/2019 | Androulaki | |
| 10,361,870 B2* | 7/2019 | Chow | |
| 2016/0094348 A1* | 3/2016 | Takahashi | H04L 9/0866 |
| | | | 713/175 |
| 2016/0342994 A1* | 11/2016 | Davis | G06Q 20/027 |
| 2017/0287068 A1* | 10/2017 | Nugent | G06Q 20/08 |
| 2018/0117446 A1* | 5/2018 | Tran | A61B 5/0022 |

(Continued)

OTHER PUBLICATIONS

"Oraclize Documentation", Oraclize, dated Jun. 11, 2019, pp. 1-43, published online by Oraclize at URL https://docs.oraclize.it/#home.

(Continued)

*Primary Examiner* — Mohamed A. Wasel
(74) *Attorney, Agent, or Firm* — Brinks Gilson & Lione (57) ABSTRACT

A master oracle may receive an oracle network identifier for an oracle network. The master oracle may receive a plurality of data messages respectively generated by the oracles. The master oracle may verify, based on respective public keys for the oracles, that each of the data messages are digitally signed by a different corresponding one of the oracles. The master oracle may aggregate the data messages into an aggregated data message. The master oracle may digitally sign the aggregated data message with a private key and public key pair. The master oracle may transmit the aggregated data message to a participant node of a distributed ledger network. A smart contract stored on a blockchain may verify the aggregated data. After receiving and verifying the aggregated data message the smart contract may execute to perform operations based on the aggregated data message.

20 Claims, 5 Drawing Sheets

(56) References Cited

U.S. PATENT DOCUMENTS

| | | | | |
|---|---|---|---|---|
| 2018/0331835 A1* | 11/2018 | Jackson | ................ | H04L 9/3247 |
| 2019/0081796 A1* | 3/2019 | Chow | ................... | H04L 9/3247 |
| 2019/0220813 A1* | 7/2019 | Madisetti | ........... | G06Q 10/0833 |
| 2019/0229926 A1* | 7/2019 | Handa | ....................... | H04L 9/30 |
| 2019/0244195 A1* | 8/2019 | Ma | ......................... | G06Q 20/02 |
| 2019/0251557 A1* | 8/2019 | Jin | ........................ | G06F 21/602 |

OTHER PUBLICATIONS

"What's a blockchain oracle?," Blockchain Hub, retrieved from the Internet on Jun. 13, 2019, pp. 1-5, published online by BlockchainHub at URL https://blockchainhub.net/blockchain-oracles/.

Provable Things, "Understanding oracles," Provable, dated Feb. 18, 2016, pp. 1-7, published online by Provable at URL https://blog.oraclize.it/understanding-oracles-99055c9c9f7b.

* cited by examiner

MULTI-SOURCE DETERMINISTIC ORACLE MANAGEMENT

TECHNICAL FIELD

This disclosure relates to blockchain technology and, in particular, to oracles for smart contracts stored in distributed blockchain networks.

BACKGROUND

A smart contract for distributed ledger technology may include logic to evaluate information and provide deterministic outcomes that are tracked in a decentralized network of blockchains. An oracle may provide a trusted external source of information for the smart contract. In some examples, the oracle may receive data from a single source, which ensures a smart contract operates deterministically. Single data source oracles may be subject to vulnerabilities, such as failure, security threats, inaccuracies, or deprecation, which could degrade the quality of information provided to the smart contract or result in improper execution of a smart contract. Under consensus-based approaches, multiple oracles may operate according to an oracle consensus protocol. The oracle consensus protocol may specify rules for establishing trust levels for the multiple oracles. Consensus-based approaches may take time to derive consensus, and compromised data may be sent to a smart contract or stored on a blockchain before corrective action is taken.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

An oracle may include a trusted agent that verifies information or events that are submitted to, or received from, a blockchain or a smart contract of a blockchain. The oracle may receive information and digitally sign the information to signify information satisfies a contract, agreement, standard, and/or criteria. For example, the digital signature may signify compliance with a communications protocol and/or a data format. In some examples, the communications protocol and/or data format may be specified by a smart contract. The smart contract may deterministically change states, unlock information, trigger predefined operations, and/or update a blockchain in response to data received from the oracle.

An oracle may have various types, including, for example, a software oracle and/or hardware oracle. Software oracles may provide information technology sources external to a blockchain. For example, software oracles may provide, by way of example, weather information, price information (for commodities, goods, securities, etc), travel information, and many other types information available via application programming interfaces (API), database, streaming sources, and/or other cloud sources. Hardware oracles may derive information from physical measurement or detection of physical events. For example, a hardware oracle may receive data from a hardware source, such as a sensor or actuator and provide the data to smart contracts.

In deterministic approaches to oracle management, an oracle may receive data from a data source to ensure a smart contract operates within deterministic outcomes on the blockchain. Vulnerabilities may arise as the data source may be subject to failure, security threats, inaccuracies, or deprecation, which could degrade the quality of information provided to the smart contract. In consensus based approaches to oracle management, multiple oracles may operate according to an oracle consensus protocol to receive data from multiple sources. The oracle consensus protocol may specify rules for establishing trust between the multiple oracles. For example, an oracle consensus protocol includes rules for determining when a data source has become compromised. A smart contract may receive and/or accept data only from oracles, which have been designated as trustworthy according to the consensus protocol. Consensus-based approaches may take time to derive consensus. Moreover, underperforming oracles may not be immediately detected, causing non-deterministic outcomes or smart contract failure.

System and methods for multi-source deterministic oracles and management thereof are provided. By way of introductory example, a master oracle may receive an oracle network identifier. The oracle network identifier may identify an oracle network. The oracle network may include multiple oracles in communication with separate data sources. The master oracle may identify oracle identifiers linked with the oracle network identifier. The master oracle may determine respective public keys for the oracles corresponding to the oracle identifiers. The master oracle may receive a plurality of data messages respectively generated by the oracles. The master oracle may verify, based on the respective public keys for the oracles, that each of the data messages are digitally signed by a different corresponding one of the oracles. The master oracle may aggregate the data messages into an aggregated data message. The master oracle may digitally sign the aggregated data message with a private key and public key pair. The public key may be accessible to a participant node of a distributed ledger network. The master oracle may transmit the aggregated data message to the participant node. The participant node may include a blockchain. The participant node may receive and/or verify the aggregated data message. The smart contract may execute logic to based on the aggregated data message in response to the data message being received and/or verified.

In another example, the system may include an oracle management service. The oracle management service may include an oracle index repository. The oracle index repository may include a plurality of oracle identifiers mapped to an oracle network identifier. The oracle network identifier may represent an oracle network. The oracle identifiers may represent oracles in the oracle network. The oracles may include a master oracle configured to aggregate data messages received from other oracles in the oracle network into an aggregated data message. The oracle management service may receive an oracle registration request. The oracle management service may extract parameters from the oracle registration request, the parameters comprising a network identifier and a public key. The oracle management service may register an oracle by storing, in the oracle index repository, an oracle identifier for the oracle and the public key. The oracle management service may map, in the oracle index repository, the oracle identifier and the public key to the oracle network identifier. The oracle management service may receive a smart contract registration request. The smart contract registration request may include an oracle network identifier for the oracle network. The oracle management service may select, from the oracle index repository, the master oracle for the oracle network. The oracle management service may cause the participant node to receive the aggregated data message from the master oracle.

An example of a technical advantage provided by the system and methods described herein is the aggregated data message may provide additional insights and data veracity that is not available under existing approaches. For example, oracles of an oracle network may each receive data messages of the same data type or related to the same event. The master oracle may access the data messages in a round-robin manner and aggregate the data messages into an aggregated data message. The aggregated data message may include a confidence measurement that accounts for differences between the data messages attributable to various causes, including, for example, measurement error, rounding error, timing errors, operation errors, calibration errors, or other causes. Alternatively or in addition, the master oracle may combine data messages received from the other oracles by way averaging and/or data smoothing in a manner accepted by a smart contract for a blockchain. The aggregated data message may further include the digital signatures(s) of one or more oracles that provided the data messages. Accordingly, a recipient, such as a smart contract, of the aggregated data message may verify the aggregated data message, and the oracles that contributed to the aggregated data message, based on the digital signatures included in the aggregated data message.

Another example of a technical advantage provided by the system and methods described herein is the oracle management service may provide multi-source oracles based on data type. The oracle management service may include an authority to register oracles, master oracles, and/or select master oracles for smart contracts. Alternatively or in addition, the oracle management service may provide a source of cryptological information that the master oracle and/or smart contract may access to verify information received from one or more oracles.

Additional or alternative benefits, efficiencies, and improvements over existing approaches are made evident in the systems and methods described below.

Figure 1:
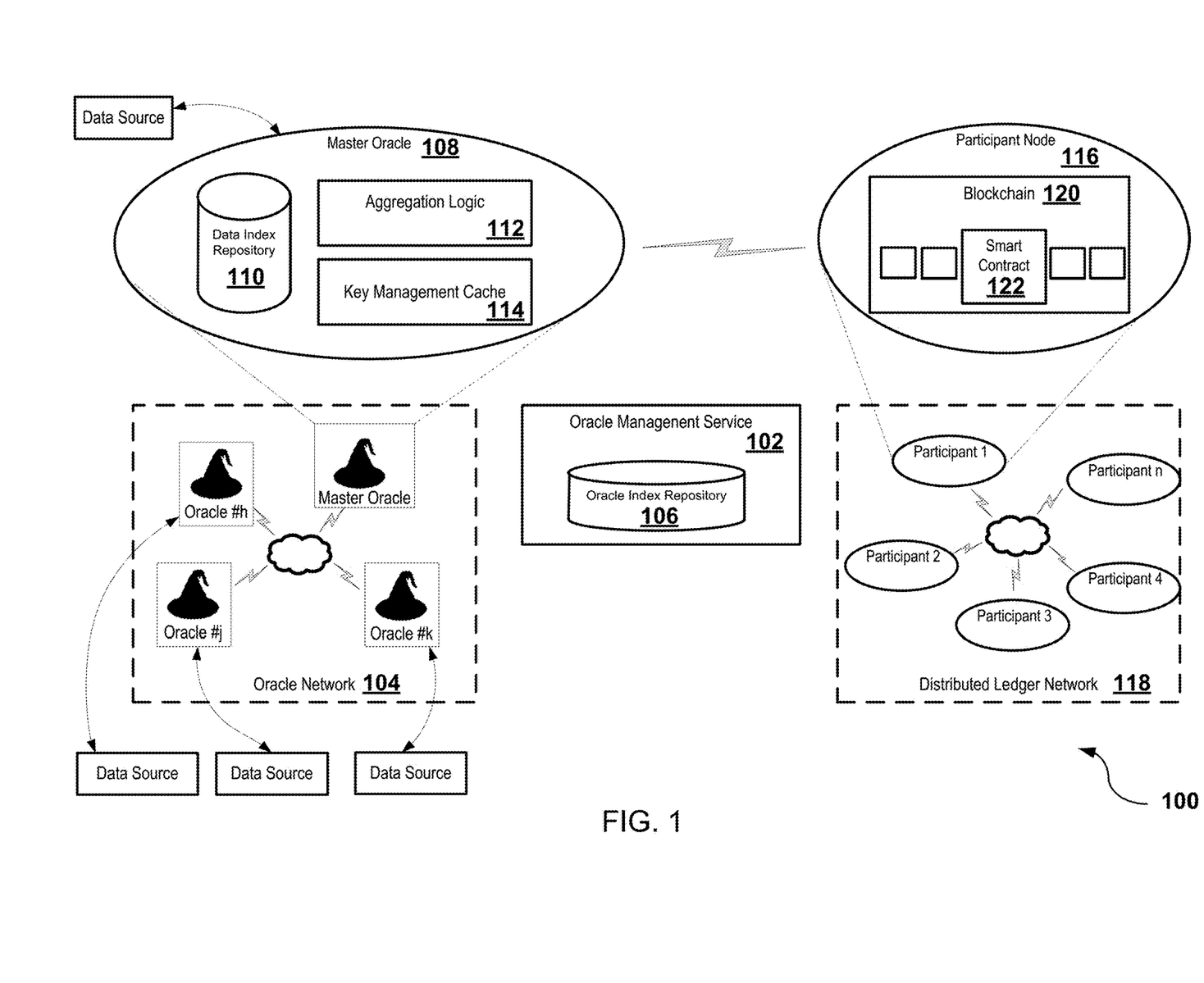
FIG. 1 illustrates a first example of a system.

FIG. 1 illustrates a first example of a system 100. The system 100 may include an oracle management service 102.

Oracle Management Service

The oracle management service 102 may include rules, logic, and criteria for establishing an oracle network 104. For example, the oracle management service 102 may register and/or un-register one or more oracles in the oracle network 104.

The oracle network 104 may include multiple oracles that receive data from separate data sources. The oracles of the oracle network 104 may each receive data messages that describes the same type of event or events. The data sources may detect or receive information related to the same event, fact, or type of information. For example, the data sources may provide data to respective oracles in different formats and/or with different interpretations of information and/or an event. In some examples, the data received from the data sources may have differences attributable to recording time, processing delays, machine calibration, sensitivities, rounding error, user error, and/or other causes of disparity. By way of example, a stock price may be captured by different data sources and verified by respective oracles. The reported stock prices may have a disparity attributable to various causes, including, for example, differences in the times (e.g. seconds or milliseconds) the stock price was recorded.

In general, a data source may refer to a source of stored or streaming data. The data source may include an endpoint that provides data to one or more oracles. The data source may be communicated via network address, memory address, and/or any other communication-based address. In some examples, the data source may include an application-programming interface (API) that provides data or, initiates a data stream, upon request. Alternatively or in addition, the data source may include a sensor that derives sensor information based on detection of physical events and occurrences.

The oracles of the oracle network 104 may receive data from respective data sources. Each of the oracles may establish a communication channel with the data source and digitally sign data received from the data sources. An oracle may be assigned (or generate) a private and public key pair. The oracle may sign data received from a data source based on the private and public key pair. In some examples, signing the data may involve generating a hash of the received data and then signing the hashed data. Alternatively or in addition, signing may involve cryptologically encrypting at least a portion of the received data with the private and public key pair. Accordingly, a digital signature may include an encrypted hash or encrypted data that is verifiable based on a public key. The public key for the oracle may be externally available and a receiver of the digital signature may verify that the oracle generated the digital signature by decrypting the signed hash or data with the public key.

In some implementations, the oracles may each include logic to reformat and/or modify data received from the data source to a particular format or standard. For example, smart contract(s) may be operative to process data in a particular format and/or adhere to a particular interface standard or data schema. At least one of the oracles of the oracle network 104 may include conversation logic that converts or reformats the received data to a format accepted by the smart contract(s).

The oracle management service 102 may include an oracle index repository 106. The oracle index repository 106 may store information descriptive of oracles, and associations between the oracles, for one or more oracle network. For example, the oracle index repository 106 may store oracle identifiers, public key information, address information, and any other information descriptive of an oracle, data received by the oracle, and associations with other oracles. Table 1 illustrates an example of data and mappings between data included in the oracle repository.

TABLE 1

Oracle Management Repository Data

| Oracle Identifier | Oracle Network Identifier | Oracle IP Address | Public Key | Data Description | Master Oracle |
|---|---|---|---|---|---|
| Oracle A | Network 1 | 10.70.0.1 | [6AEB . . . ] | Weather | 0 |
| Oracle B | Network 1 | 10.70.0.2 | [6AEB . . . ] | Weather | 1 |
| Oracle h | Network 2 | 10.70.1.1 | [6AEB . . . ] | Stock price | 0 |

TABLE 1-continued

Oracle Management Repository Data

| Oracle Identifier | Oracle Network Identifier | Oracle IP Address | Public Key | Data Description | Master Oracle |
|---|---|---|---|---|---|
| Oracle I | Network 2 | 10.70.1.2 | [6AEB . . . ] | Stock price | 0 |
| Oracle J | Network 2 | 10.70.1.3 | [6AEB . . . ] | Stock price | 0 |
| Oracle K | Network 2 | 10.70.1.4 | [6AEB . . . ] | Stock price | 1 |
| . . . | . . . | . . . | . . . | . . . | . . . |

Table 1, and the information included therein, is provided by way of example. In practice, the oracle repository may include multiple tables or data structures. The oracle repository may store mappings between oracle identifiers, public keys, network identifiers, network addresses, and other information. For example, the oracle repository may be queried to identify a public key for a particular oracle. Alternatively or in addition, the oracle repository may store mappings or links between network identifiers and oracle identifiers. A mapping may include, for example, one to one, one to many, and/or many-to-many table relationships. In other examples, the mapping may include any association in a relational or non-relational database or memory. Alternatively or in addition, the mappings between oracles and oracle networks may include any information that associates an oracle identifier with an oracle network identifier. The oracle identifier may include a unique identifier of an oracle. Alternatively or in addition, the oracle identifier may include address information to communicate with an oracle, such as an Internet Protocol (IP) address, Media Access Control (MAC) address, a memory address, and/or some other address. The oracle network identifier may include any unique identifier or the oracle network 104, and/or address information to designate the oracle network.

Figure 2:
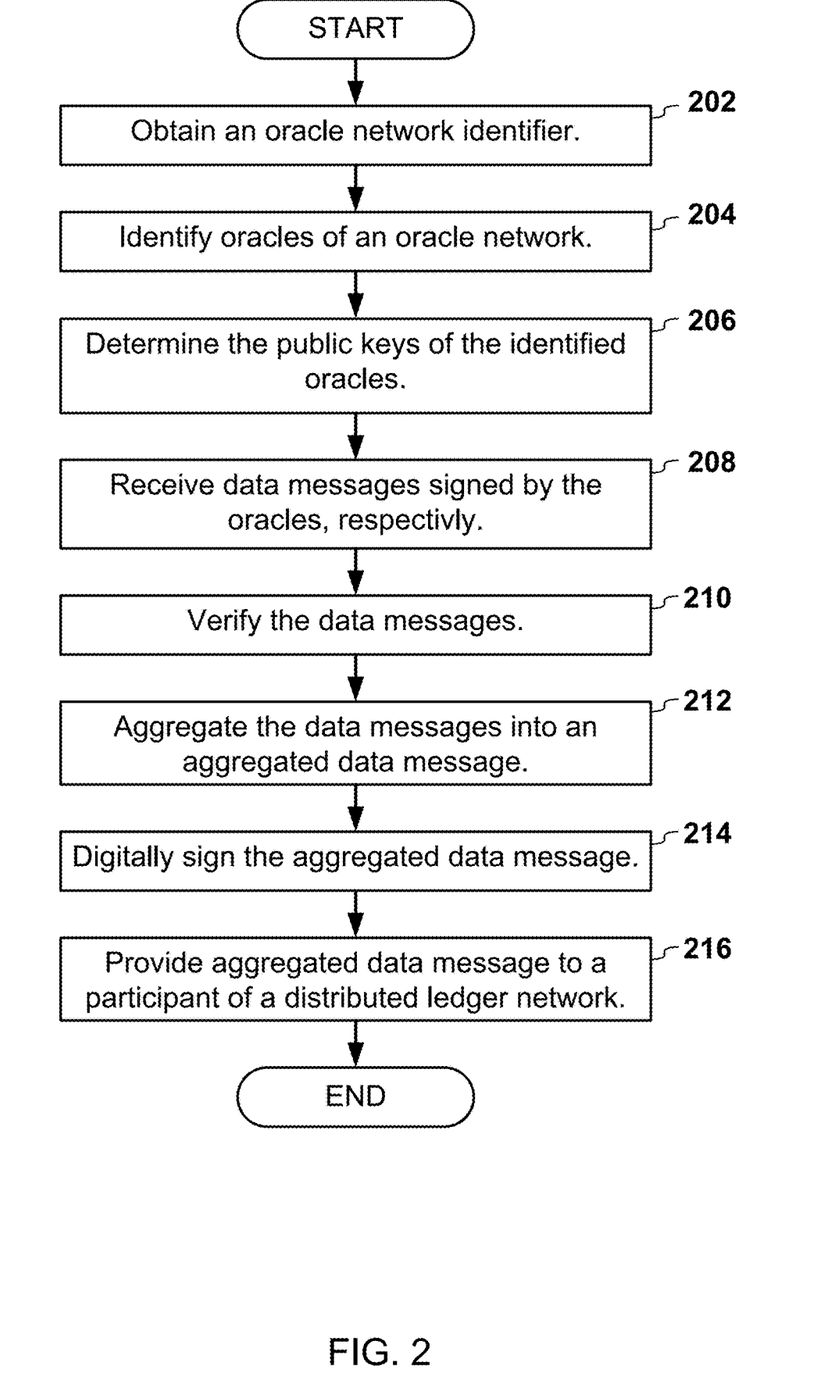
FIG. 2 illustrates a first example of logic for a master oracle.
Figure 3:
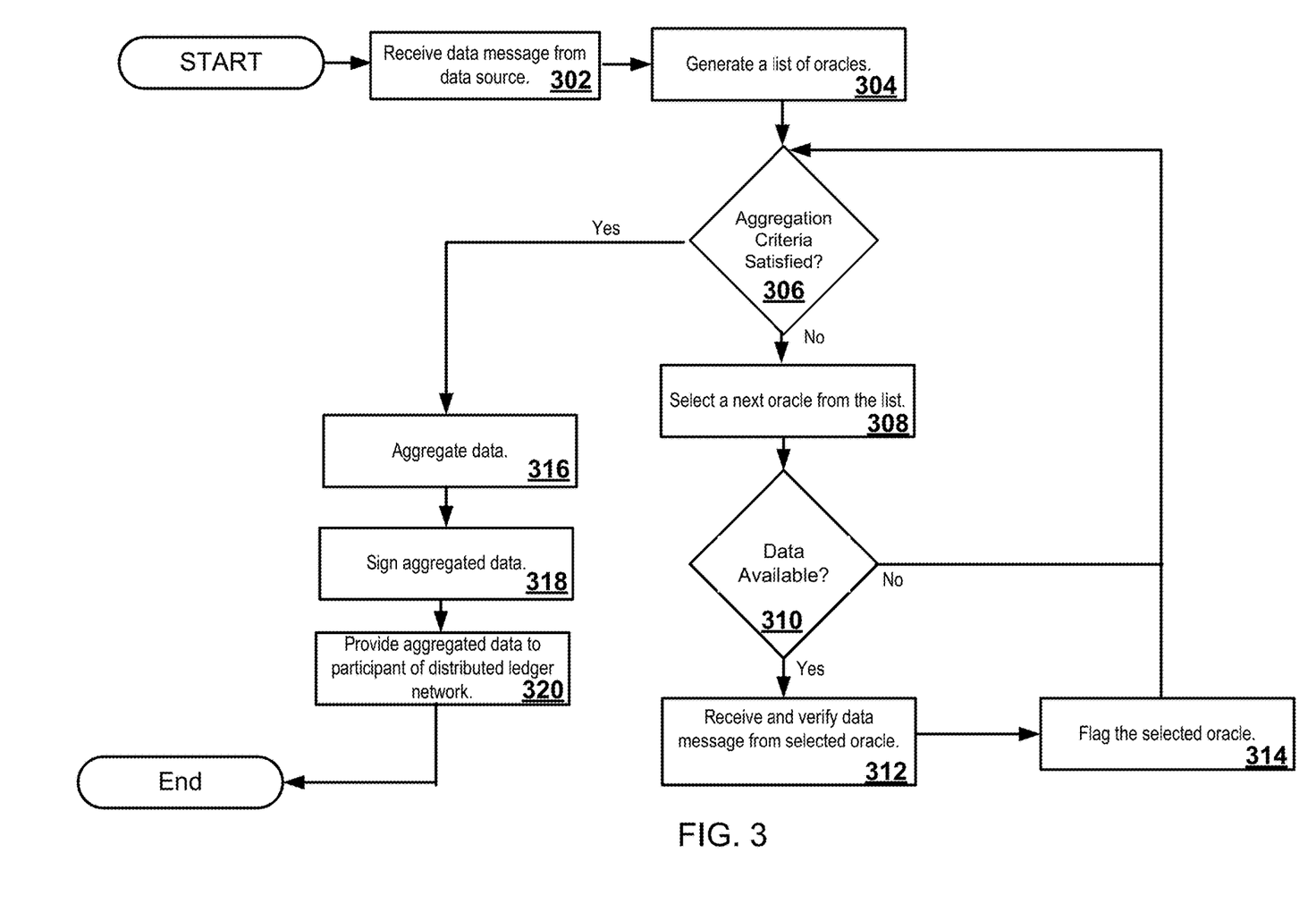
FIG. 3 illustrates a second example of logic for a master oracle.

In some examples, one or more oracles of the oracle network 104 may be designated a master oracle 108. The master oracle 108 may receive data messages from one or more of the oracles in the oracle network 104. The master oracle 108 may aggregate the data messages to generate an aggregated data message. The MASTER ORACLE section below and the discussion in reference to FIGS. 2-3 provides additional examples and explanations related to the master oracle 108).

In some examples, the oracle management service 102 may provide configuration parameters to the master oracle 108. The configuration parameters may include, for example, oracle identifiers (for the oracles the master oracle 108 will receive data from), an oracle network identifier (for the oracle network assigned to the master oracle 108), public keys for the oracles (to verify data received from the oracles), and/or a master oracle identifier (the oracle identifier of the master oracle). The oracle management service 102 may provide updated configuration parameters to the master oracle 108 in response to one or more oracles joining or leaving an oracle network tracked by the oracle management service 102. Alternatively or in addition, the oracle management service 102 may request configuration requests from the master oracle 108, and the oracle management service 102 may provide updated configuration parameters to the master oracle 108 in response to receiving the configuration request.

Master Oracle

The master oracle 108 may include a data index repository 110. Data messages received from one or more oracles may be stored in the data index repository 110. The stored data messages may be mapped with receipt information. The receipt information may include the oracle identifier that provided the data, time information for when the data was received or generated, an identifier of the data source that generated the information, and/or other information that is descriptive of the data message, the oracle that verified the data message, the digital signatures of the oracles that provided the data, and/or the data source of the data message.

In general, a data message may represent a unit of information transmitted by a device. The data message may include an identifiable portion of a stream of data. Alternatively or in addition, the data message may include a piece of data transmitted with a start and/or end time. By way of example, the data message may include an IP packet, series of IP packages, event, or any other identifiable unit of information. In some examples, the data message may include a digital signature of the sender. The digital signature may include a hash of at least a portion of the data message signed based on a private/public key pair. Alternatively, the digital signature may accompany the data message. For example, the one or more oracles may send the digital signature with the data message.

The master oracle 108 may include aggregation logic 112. The aggregation logic 112 may include logic to aggregate data messages generated by one or more oracles. In some examples, the aggregation logic 112 may include logic to concatenate the data messages received from other oracles into an aggregated data message. The aggregated message may include data and digital signatures generated by the other oracles. The aggregated message may be signed by the master oracle 108. For example, the master oracle 108 may generate a hash of the data message, or a portion thereof, with a private/public key pair. Alternatively, the master oracle 108 may encrypt all or a portion of the data message based on the private/public key pair.

The aggregation logic 112 may reformat, combine, and/or weight information received from various oracles to generate new data based on the received data messages. Alternatively or in addition, the aggregated logic may include logic to generate metadata that is included in the aggregated data message. Table 2 includes examples of metadata that may be generated by the aggregation logic 112.

TABLE 2

Example Metadata

| | |
|---|---|
| Oracle Source Identifier Information | Identifying information of the oracle that provided a data message. The identifying information may include oracle identifiers, network addresses, memory addresses, etc. |
| Data Source Identification Information | Identifying information of the data source that provided data. The identifying information may include unique identifiers of a data source, network addresses, memory addresses, etc. |
| Timestamp information | Information descriptive of the time one or more data messages were received, generated, or communicated. Information descriptive of the time the aggregated data message is generated or communicated. |
| Confidence Measurement | A measurement of a disparity or difference between information included in data messages. For example, as disparity increases, the confidence measurement may decrease. |

TABLE 2-continued

Example Metadata

| | |
|---|---|
| Statistical Measurement | Various statistical measurements or determinations based on data messages received from multiple oracles, including, for example, sum, average, mean, median, mode, weighting, or other statistical calculations. |

As data messages are collectively received from various oracles, the master oracle 108 may execute the aggregation logic 112 to generate statistical insight information regarding the data messages. The statistical insight information may include, for example, a disparity metric. The disparity metric may include a measure of a difference between one or more data messages or one or more groups of data messages. The disparity metric may include square error, standard error, standard deviation, variance, confidential intervals or confidence levels and/or any other statistical measure of difference or similarity. The statistical insight information may include a smoothing metric. The smoothing metric may include averaging values, median values, and/or any other value that is generated to provide statistical smoothing of a data set.

By way of example, the master oracle 108 may receive temperature indices of a specific location from other oracles, including itself. For example, the list of temperature indices may include the following values, which are received from separate oracles: 25.1; 25.4; 26.3; 24.9; 24.8; 25.5; 26.2; 24.9. The master oracle 108 may create these one or more metrics including, for example, Mean: 25.39; Median: 25.25; Sample standard deviation: 0.5866; Confidence level at 90% is: [25.05 to 25.73]; Confidence level at 95% is: [24.98 to 25.8]; Confidence level at 99% is: [24.86 to 25.92], etc. The master oracle may include the metrics in the aggregated data message.

The master oracle may generate a digital signature of the statistical insight information. The aggregated data message may include the statistical insight information and/or the digital signature of the statistical insight information signed by the master oracle. Alternatively or in addition, the aggregated data message may include the digital signatures of the data messages that were provided to the master oracle by the various oracles to determine the statistical insight information.

The master oracle 108 may include a key management cache 114. The key management cache 114 may include a local cache of information descriptive of other oracles and/or oracle networks. For example, the key management cache 114 may include the network identifier of the oracle network 102 assigned to the master oracle 108. Alternatively or in addition, the key management cache 114 may include the public keys and/or oracle identifiers of the oracles that communicate data messages to the master oracle 108. In some examples, the master oracle 108 may access oracle identifiers from the key management cache 114 to determine which oracles to accept data from. Alternatively or in addition, the master oracle 108 may access public keys from the key management cache 114 to verify data messages received from other oracles. The master oracle 108 may access oracle information locally, which may improve efficiency and processing times over accessing the oracle management service 102, or remote sources. The key management cache 114 may be periodically updated by the master oracle 108 or by an external authority to ensure the master oracle 108 has the latest oracle information.

Distributed Ledger Network

The master oracle 108 may submit the aggregated data message to a participant node 116 (or participant nodes) of a distributed ledger network 118. For example, the master oracle 108 may submit the aggregated data to a blockchain 120 and/or to a smart contract 122 stored on the blockchain 120.

The participant node 116 may include a participant node 116 of the distributed ledger network 118. The participant node 116 may include a memory that stores the blockchain 120. Alternatively or in addition, the participant node 116 may include, or access, a distributed ledger technology (DLT) platform. The DLT platform may govern interactions with the blockchain 120 and consensus between the parent nodes.

The distributed ledger network 118 may include a plurality of participant nodes that respectively communicate based on the distributed ledger technology (DLT) platform to access, submit, modify, and/or remove information stored on local instances of the blockchain 120. Each of the participant nodes may include a full or partial copy of the blockchain 120 (e.g. a local blockchain). The participant nodes of the distributed ledger network 118 may submit transactions to the DLT platform. The consensus protocol of the DLT platform may determine whether to append the transaction to local instances of the blockchain 120. The consensus protocol may prevent modification to previously appended or existing information in the blockchain 120. In some DLT platforms, modifications to the blockchain 120 may be prohibited unless a majority, or some other predefined portion, of the participant nodes consent to the modifications.

The blockchain 120 may include datablocks that are linked according to a cryptography. The arrangement of data blocks and associations between information stored in the data blocks are established by the DLT platform. For example, the blockchain 120 may provide a growing, shared digital data flow, which serves as the source of truth between the participant nodes of a distributed ledger network 118. Depending on the DLT platform, the datablocks of the blockchain 120 may include a genesis datablock that is the initial datablock of the blockchain 120. Successive datablocks may be appended to the blockchain 120 over time. The blockchain 120 may provide a chronological ledger of information. One or more of the successive datablocks may include a hash of a previous datablock, a hash of a header of the previous datablock, and/or a hash of portions of the previous datablock, depending in the DLT platform. Modifications to one or more datablocks in the blockchain 120 may cause inconsistencies in the hashed information stored in the successive datablocks. The inconsistencies may be detected and the participant nodes of the distributed ledger network 118.

The blockchain 120 may include a smart contract 122. In general, a smart contract 122 may include logic that dictates how information is to be stored on the blockchain 116 and/or a protocol appending data to the blockchain 120 in response to detected or received information. In general, a smart contract may include data structure definitions, such as a Merkle tree, for representing data stored accords multiple blocks on a blockchain 120. The smart contract may further include logic for communicating with a DLT platform to cause changes to the blockchain 120. For example, the smart contract may submit transactions to the DLT platform. In response to consensus among participants of a DLT network, the transaction may cause information to be appended to the blockchain 120, modified, and/or revoked. A smart contract may be stored in one or more datablock on the blockchain 120. The smart contract may be identified within the blockchain 120 based on a smart contract address. The smart contract address may include the address of a datablock that stores the smart contract and/or an identifier of the smart contract.

FIG. 2 illustrates a first example of logic for the master oracle 108. The master oracle 108 may obtain an oracle network identifier (202). The oracle network identifier may identify the oracle network 104. In some examples, master oracle 108 may be configured with the network identifier during provisioning or deployment. For example, the master oracle 108 may receive the network identifier and store the network identifier in the key management cache 114, or some other storage location.

The master oracle 108 may identify the oracles of the oracle network 104 (204). For example, based on the obtained network identifier, the oracle controller may identify additional oracles associated with the network identifier. In some examples, the master oracle 108 may generate a configuration request for the oracle management service 102 (or the oracle index repository 106). Configuration results from the oracle management service 102 (or oracle index repository 106) may specify other oracles included in the oracle network 104. For example, the oracle management service 102 may send configuration parameters comprising oracle identifiers, public keys, network identifiers, or other information to the master oracle 108. The master oracle 108 may cache the configuration parameters in a local storage, such as the key management cache 114.

The master oracle 108 may determine the public keys of the identified oracles (206). In some examples, the oracle controller may generate a query request for the key management cache 114, oracle management service 102, the oracle index repository 106, and/or a certification authority. The query may specify one or more oracle identifiers. Query results from the oracle management service 102 (or oracle index repository 106) may specify the public keys of the oracles.

The master oracle 108 may receive data messages signed by one or more oracles of the oracle network 104, respectively (208). For example, the master oracle 108 may establish a communication channel with one or more oracle to receive the data messages. The communication channel may be established via connection-based protocols (i.e. TCP) and/or connection-less protocols (e.g. UDP), application protocols (e.g. HTTP), message brokers, and/or any other suitable network or memory based communication scheme. The master oracle 108 may receive the data messages(s) in batch and/or in stream. For example, the master oracle 108 may open and close a communication channel with one or more oracles.

In some examples, the master oracle 108 may cache data messages from oracles for further processing. For example, the master oracle 108 store data messages in the data index repository 110. In some examples, the data index repository 110 may associate a data message with a particular oracle. For example, the data repository may include a mapping between an identifier of an oracle and a data message that was sent by the oracle. The oracle controller may store data messages in the data repository in response to receipt of the data messages.

The master oracle 108 may verify data messages generated by the oracles of the oracle network 104 (210). For example, a data message received by the master oracle 108 may be digitally signed by a sender oracle. The digital signature applied to the data message may be a cryptologic signature. The data message may be signed based on a private and public key pair. The public key may be accessible to the master oracle 108. The master oracle 108 may decrypt the data message, or information therein, based on the public key. The decryption may verify that the sender oracle signed the data message using the private key.

The master oracle 108 may aggregate data messages into an aggregated data message (212). For example, the master oracle 108 may access the aggregation logic 112 described in reference to FIG. 1. The master oracle 108 may apply one or more data messages to the aggregation logic 112. Execution of the aggregation logic 112 may generate the aggregated data message. In some examples, the master oracle 108 may communicate with a data source. The master oracle 108 may receive data from the data source in addition to the data messages receive by oracle(s) of the oracle network 104. The aggregation logic 112 may generate aggregated data based on the data messages received from other oracle(s) of the oracle network 104 and the data messages received from the data source of the master oracle 108.

In some examples, the master oracle 108 may include the respective digital signatures of the oracles and/or the master oracle 108 in the aggregated data message. The smart contract 122 and/or the participant node 116 that accesses the smart contract 112, may verify the respective digital signatures based on the respective public keys for the oracles and/or the master oracle 108.

The master oracle 108 may digitally sign the aggregated data (214). For example, the master oracle 108 may have access a private key that is paired of a public key. The master oracle 108 may generate a digital signature. The digital signature may include, for example, a hash of the aggregated data message based on the private/public key pair. Recipients of the aggregated data message may verify the master oracle 108 signed the aggregated data message (generated the digital signature) based on the public key.

The master oracle 108 may provide aggregated data message to the participant node 116 of the distributed ledger network 118 (216). For example, the master oracle 108 may transmit the aggregated data message to the participant node 116. The participant node 116 may store aggregated data message in the blockchain 120 and synchronize the blockchain 120 based on a DLT platform. In some examples, the participant node 116 may execute logic of the smart contract 122. The smart contract 122 may cause the participant node 116 to communicate with the master oracle 108. Alternatively or in addition, the smart contract 122 may include logic which generates deterministic results based on the aggregated data message. The deterministic results may include data that is stored on the blockchain 120 in response to executing the smart contract 122 with the aggregated data.

The participant node 116 may verify the digital signature for the aggregated message based on the public key of the master oracle 108. The participant node 116 may verify the respective digital signatures included in the aggregated data message based on the public keys of the oracles that generated the digital signatures included in the aggregated data message. The participant node 116 may execute the smart contract 122 in response to receiving and verifying the aggregated data message. When executing the smart contract 122, the logic of the smart contract 122 may cause the participant node 116 to evaluate the aggregated data message and generate result information in response to the aggregated data message satisfying predetermined conditions or logic of the smart contract 122. For example, the smart contract 122 may include predetermined operations that are performed to derive new in the form of result information. The result information may then be stored on the blockchain and/or distributed across multiple participant nodes according to consensus protocol of the distributed ledger network.

In some examples, the smart contract 122 may include verification logic to verify the digital signature(s) of the master oracle 108 and/or other oracles. For example, the verification logic may include an instruction to access the public key(s) determine the master oracle 108, and/or other oracles, signed a digital signature. The participant node 116 may execute the logic to verify the digital signature(s).

In some examples, the participant node 116 may access quality of service criteria. The quality of service criteria may compare the disparity metric of the aggregated data message to a predetermined disparity threshold. For example, as the difference between data messages provided by various oracles becomes too great, the outcome of the smart contract 122 may be come unreliable or non-deterministic. Depending on the disparity metric, the quality of service criteria may include an instruction to allow or inhibit execution of the smart contract 122 in response to the disparity metric being greater than (or less then) the predetermined disparity threshold. In some examples, the predetermined disparity threshold and/or the quality of service criteria may be included in the smart contract 122.

FIG. 3 illustrates a second example of logic for the master oracle 108. The master oracle 108 may receive a data message from a data source (302). The data source may include a non-oracle data source in communication with the master oracle 108. The data source for the master oracle 108 may be separate from other oracles and not accessed by the other oracle(s). The data source may provide data that has not been digitally signed by any of the other oracles. The master oracle 108 may digitally sign information received by the data source to signify the data was generated by the data source and the master oracle 108 agrees that the data is authentic and adheres to rules, criteria, and other guarantees of the oracle network.

The master oracle 108 may generate a list of oracles (304). The list of oracles may include a list of oracles that are designated as data providers for the master oracle 108. The list of oracles may include oracles that generate data messages of a particular data type or topic. In some examples, the list of oracles may be stored in the key management cache 114.

In some examples, the list of oracles may be generated based on predetermined oracle identifiers associated with the master oracle 108. For example, the master oracle 108 may be associated with the oracle network 104, and the master oracle 108 may determine the oracles of the oracle network 104. Alternatively or in addition, the master oracle 108 may receive configuration parameters from an authority, such as the oracle management service 102, and generate the list of oracles based on the configuration parameters.

In some examples, the receipt of the data message from a non-oracle data source may trigger dynamic generation of the list of oracles. For example, the master oracle 108 may receive the data message and then generate the list of oracles for the received data message. The list of oracles may be mapped to the receive data message. Additional data messages received from the oracles of the oracle network 104 may be aggregated with the data message received from the data source. Master oracle 108 may enrich the non-oracle data by aggregating the non-oracle data with data received from other oracles.

In some examples, receipt of the data message from the non-oracle data source may trigger the master oracle 108 to begin accumulating data messages received from other oracles. The data messages received from the other oracles may represent the same event and/or fact (e.g. stock prices, weather, shipping status, etc). The data messages received from the other oracles may be stored and accumulated in the data index repository 110 in response to receiving the data message from the non-oracle data source.

Alternatively or in addition, the master oracle 108 may determine the non-oracle data source is associated with a particular data type or topic. The master oracle 108 may determine that the data type or topic is associated with a set of oracles (or an oracle network). For example, the master oracle 108 may access the oracle management service 102 to identify relevant oracles or oracle network(s). The master oracle 108 may generate the list of oracles based on the oracle identifiers provided by the oracle management service 102.

After the list of oracles are generated, the master oracle 108 may determine whether aggregation criteria is satisfied (306). The aggregation criteria may include criteria to establish whether to proceed with data aggregation based on the information received from the oracles. For example, the aggregation criteria may determine whether a predetermined number (or all) oracles in the list of oracles have provided data. Oracles may be removed from the list and/or flagged to indicate data has been received. In some examples, the master oracle 108 may abandon data aggregation in response to a predetermined number of oracles being non-responsive.

In some examples, the aggregation criteria may include a condition that at least one of (or a predetermined number of) the oracles have provided data. Alternatively or in addition, the aggregation criteria may include a condition that a predetermined amount of time has elapsed. For example, the aggregation criteria may evaluate how old a data message is or if a data message has become stale.

In response to the aggregation criteria not being satisfied (306, NO), the master oracle 108 may select the next oracle from the list (308). For example, the list of oracles may include oracle identifiers. The master oracle 108 may select the next oracle identifier (or the initial oracle identifier, depending on the iteration). In some examples, the master oracle 108 may select the next oracle that is indicated as not processed. For example, the master oracle 108 may select the next oracle that has not been flagged as processed.

In examples where data messages are accumulated in the data index repository 110, the master oracle 108 may purge data message(s) from the data index repository 110 in response to the aggregation criteria not being satisfied, or some other condition. For example, the master oracle 108 may determine that one or more message have remained in the data index repository 110 longer than a predetermined amount of time.

The master oracle 108 may determine whether data is available from the selected oracle (310). For example, the master oracle 108 may communicate with the selected oracle to determine whether any data has been received within a preset time window. Alternatively or in addition, the master oracle 108 may asynchronously communicate with one or more oracles and store receive data messages in the oracle index repository 106. To determine whether data is available from the selected oracle, the master oracle 108 may access the data messages from the oracle index repository 106.

In response to data being available (310, YES), the master oracle 108 may receive and verify data message(s) generated by the selected oracle(s) (312). For example, the master oracle 108 may decrypt the data message(s) based on a public key associated with the selected oracle. In response to data not being available (310, NO), the master oracle 108 may return to determining whether the oracle criteria is satisfied. For example, the selected oracle may be ignored and/or tried again at a later time. In some examples, the selected oracle may be flagged as non-responsive if the oracle.

After the data is received, the master oracle 108 may flag the selected oracle 314. The master oracle 108 may flag the selected node to indicate data was received. The selected node may be unflagged after a preset time threshold and/or when new data becomes available from the data source of the master node. Alternatively or in addition, the master oracle 108 may remove the selected oracle from the list of oracles that was previously generated (i.e. a separate list of oracles may be generated for each set of non-oracle received from the data source of the master oracle 108).

When the master node 108 determines that the aggregation criteria is satisfied (306, YES), the master node may proceed to aggregate the data (316). The master node may sign the aggregated data (318). The master node may provide the aggregated data to the participant node 116 of the distributed ledger network 118 (320). For more information regarding operations 316-320, refer to operations 212-216 in reference to FIG. 2.

Figure 4:
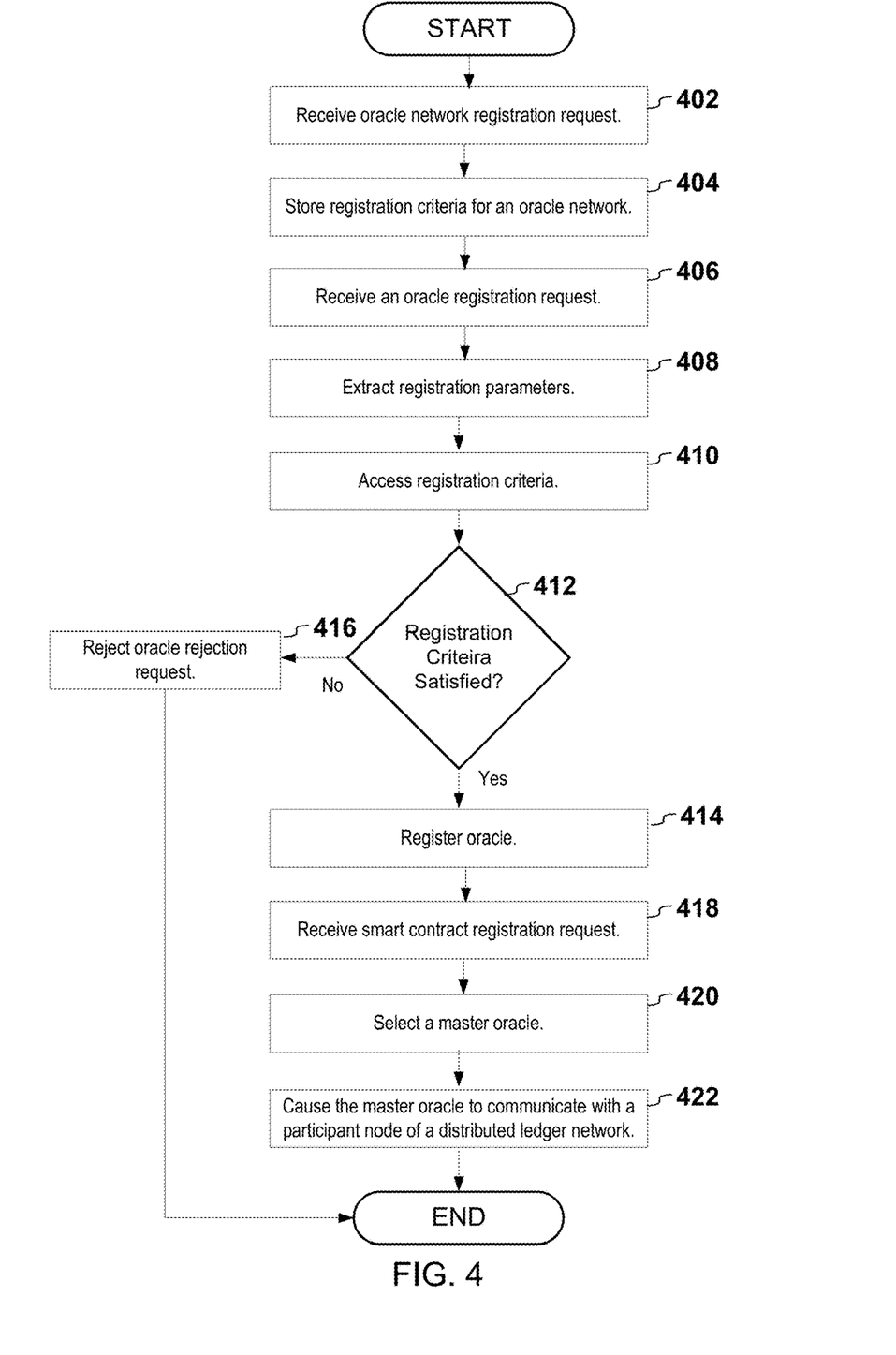
FIG. 4. Illustrates an example of logic for an oracle management service.

FIG. 4. Illustrates an example of logic for the oracle management service 102. The oracle management service 102 may receive an oracle network registration request (402). The oracle network registration request may include network registration parameters to create the oracle network 104 and/or control which oracles are permitted in the oracle network 104.

In some examples, the network registration parameters may include a registration criteria. The registration criteria may specify rules for registering new oracles for the oracle network 104. For example, the registration criteria may include logic to evaluate, approve, or disapprove a request for an oracle join the oracle network 104. For example, the registration criteria may specify one or more data formats and/or one or more communication protocols that an oracle must adhere to in order to join the oracle network 104. Alternatively or in addition, the registration criteria may include test logic to evaluate oracle operation prior to network admittance. For example, the registration criteria may include test logic to determine if an oracle is reachable, to receive a data message from the oracle, to determine whether certain fields in the data message are present, to determine whether the public key of the oracle is valid, and/or to perform other initial tests.

Alternatively or in addition, the network registration parameters of the oracle network 104 registration request may include an oracle network identifier, a data descriptor that describes the type of data accessed by the oracle network 104 (i.e. weather, stock info, parcel tracking information, etc), and/or other attributes that describe the oracle network 104 or rules for oracles that may join the oracle network 104.

The oracle management service 102 may store the registration criteria for the oracle network 104 (404). The oracle management service 102 may store the registration criteria in the oracle index repository 106, or some other suitable data storage. Alternatively or in addition, the oracle management service 102 may store the network identifier and/or any other network registration parameter of the oracle network registration request.

The oracle management service 102 may receive an oracle registration request (406). The oracle registration request may include a request for an oracle to join and the oracle network 104. The oracle registration request may include information descriptive of an oracle or data messages received by the oracle.

The oracle management service 102 may extract registration parameters from the oracle registration request (408). The registration parameters may include an oracle identifier, a network address, data format information (such as a schema), communication address information (e.g. memory address, internet protocol address, etc), public key information, and/or any other information descriptive of the oracle and/or data messages provided by the oracle. Alternatively or in addition, the registration request may include an oracle network identifier for the oracle network that the oracle being registered on.

In some examples, the oracle registration request may include a parameter that indicates the oracle is a master oracle. The oracle registration request may include additional parameters, such as oracle identifiers and/or public keys, for one or more additional oracles that the master oracle communicates with.

The oracle management service 102 may access the registration criteria (410). For example, the oracle management service 102 store multiple sets of registration criteria associated with various oracle network identifiers. The oracle management service 102 may select the registration criteria associated with the oracle network identifier specified in the oracle registration request. For example, the oracle management service 102 may query the oracle index repository 106, or some other storage that stores the oracle registration criteria.

The oracle management service 102 may determine whether the oracle registration request satisfies the registration criteria (412). The oracle management service 102 may evaluate the information included in the oracle registration request against the registration criteria. For example, the oracle management service 102 may execute logic included in the registration criteria. The logic of the oracle registration criteria may determine if an oracle is reachable, receive a data message from the oracle, determine whether certain fields in the data message are present, determine whether the public key of the oracle is valid, and/or perform other initial tests.

In response to the registration criteria being satisfied (412, YES), the oracle management service 102 may register the oracle (414). To register the oracle, the oracle management service 102 may update the oracle index repository 106. For example, the oracle management service 102 may store the oracle identifier and/or the public key for the oracle in the oracle index repository 106. The oracle management service 102 may map the oracle identifier and/or the public key for the oracle with an oracle network identifier. Alternatively or in addition, the oracle management service 102 may map the oracle identifier with public key information. In response to the registration criteria not being satisfied (412, NO), the oracle management service 102 may reject the oracle rejection request (416)

The oracle management service 102 may receive a smart contract registration request (418). The smart contract registration request may include a request to select an oracle for the smart contract 122. The smart contract registration request may include the oracle network identifier and/or an oracle identifier. Alternatively or in addition, the smart contract registration request may specify a data format, a communication protocol, a data type, and/or other information implemented by the smart contract 122. The oracle management service 102 may determine the specified oracle is registered in the oracle index repository 106 and if the specified oracle is compatible with the smart contract corresponding to the smart contract registration request.

The oracle management service 102 may select a master oracle (420). For example, the oracle registration request and/or the oracle network registration request may indicate one or more oracle identifiers for an oracle (or oracles) that is a master oracle. The oracle management service 102 may flag the oracle identifier as a "master oracle". Alternatively or in addition, all, or a portion of, by the oracles included in the oracle network 104 may include logic to act as a master oracle. The oracle management service 102 may select which of the oracles in the oracle network 104 to designate a master oracle.

In some examples, a master oracle designated by the oracle management service 102 may communicate with multiple smart contracts. The oracle management service 102 may select particular master oracles for the smart contracts, respectively. For example, in response to receiving a smart contract registration request, a master oracle may be selected for the smart contract 122. In some examples, the oracle management service 102 may select the master oracle at random. Alternatively or in addition, the master oracles may select the master oracle based on a load-balancing scheme. For example, the oracle management service 102 may flag an oracle as a master oracle in response to the oracle serving the least number of participant nodes and/or smart contracts. Alternatively or in addition, the oracle management service 102 may generate or designate new master oracles for the oracle network 104 when the number of smart contracts served by existing oracle(s) exceeds a threshold value.

The oracle management service 102 may cause the master oracle 108 to communicate with the participant node 116 of the distributed ledger network 118 (422). For example, the oracle management service 102 may cause the participant node 116 of the distributed ledger network 118 to receive the aggregated data message(s) from the master oracle 108. For example, the oracle management service 102 may transmit, to the participant node 116, the oracle identifier of the master oracle 108 and a public key of the master oracle 108. Alternatively or in addition, the oracle management service 102 may communicate configuration instructions to communicate aggregated data messages to the participant node 116 and/or the smart contract 122. For example, the configuration instruction may include including an identifier of a smart contract, such as a network address, a memory address, a block address on the blockchain 120, or any other information that may be used to access and communicate with the smart contract 122. The master oracle 108 may communicate data messages to the smart contract 122 in response to receiving the configuration instruction.

The operations illustrated in the flow diagrams of FIGS. 2-4 may include additional, different, or fewer operations than illustrated. The operations may be executed in a different order than illustrated. Moreover, the system 100 may be implemented with additional, different, or fewer components than illustrated. For example, the system may include the oracle management service 102 without the master oracle 108 and/or the participant node 116. Alternatively, the system may include the master oracle 108 without the oracle management service 102 and/or the participant node 116. In other examples, the participant node 116 may include the master oracle 108 and/or the oracle management service 102.

Figure 5:
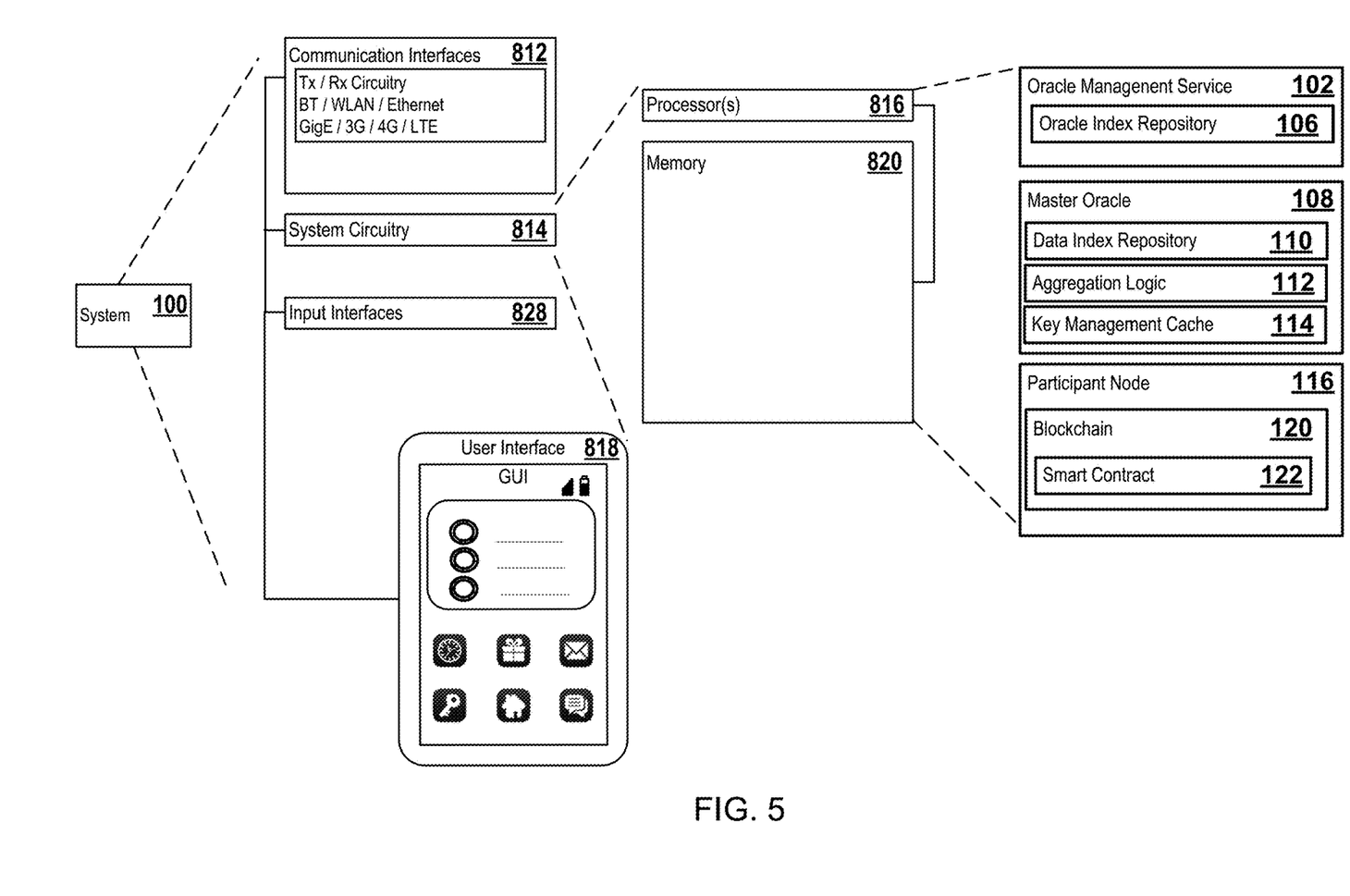
FIG. 5 illustrates a second example of the system.

FIG. 5 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the oracle management service 102, the master oracle 108, the participant node 116, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the operations the oracle management service 102, the oracle index repository 106, the master oracle 108, the data index repository 110, the aggregation logic 112, the key management cache 114, the participant node 116, the blockchain 120, the smart contract 122 and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the oracle management service 102, the oracle index repository 106, the master oracle 108, the data index repository 110, the aggregation logic 112, the key management cache 114, the participant node 116, the blockchain 120, the smart contract 122, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible.

Accordingly, the embodiments described herein are examples, not the only possible embodiments and implementations.

The subject-matter of the disclosure may also relate, among others, to the following aspects:

A first aspect may include a system comprising a master oracle. The master oracle configured to receive an oracle network identifier, the oracle network identifier indicative of an oracle network, the oracle network comprising a plurality of oracles; identify a plurality of oracle identifiers for the oracles, the oracle identifiers stored in an oracle index repository and linked with the oracle network identifier in the oracle index repository; determine respective public keys for the oracles; receive data messages and digital signatures of the data messages, the digital signatures respectively generated by the oracles; verify, based on the respective public keys for the oracles, the digital signatures as being generated by the oracles, respectively; aggregate the data messages into an aggregated data message; generating a digital signature of the aggregated data message with a private key and public key pair, the public key being accessible to a participant node of a distributed ledger network 118; and transmit the aggregated data message and the digital signature to the participant node, the participant node comprising a blockchain, wherein the participant node is configured to verify the digital signature of the master oracle, and execute a smart contract stored on the blockchain in response to verification of the digital signature, wherein execution of the smart contract with the aggregated data causes the participant node to append result data to the blockchain.

A second aspect may include the first aspect, wherein the master oracle is further configured to include the digital signatures in the aggregated data message, wherein the participant node is further configured to verify the digital signatures based on the respective public keys for the oracles.

A third aspect may include any of the first through second aspects, wherein the master oracle is further configured to receive a data message from a data source, wherein the data source is separate from the oracles and not accessed by the oracles, wherein the aggregated data message is based on data messages received from the oracles and the data message received from the data source.

A fourth aspect may include the third aspect, wherein the master oracle is further configured to accumulate, in a data index repository, in response to receiving the data message from the data source, the data messages received from the oracles, wherein the data messages are respectively mapped to the oracle identifiers for the oracles in the data index repository, wherein the aggregated data message is based on the data message received from the oracles and the accumulated data messages.

A fifth aspect may include the third aspect, wherein the master oracle is further configured to generate, in response to receiving the data message from the data source, a list of oracles to receive data from; receive data from at least one of the oracles; and determine aggregation criteria is satisfied, wherein the aggregation criteria comprises at least one of: a condition that at least one of the oracles have provided data, or a condition that a predetermined time period has elapsed.

A sixth aspect may include the any of the first though fifth aspects, wherein the data messages comprise a first data message received from a first oracle and a second data message received from a second oracle, wherein the first data message and the second data message are descriptive of a same event, wherein to aggregate the data messages into an aggregated data message, the master oracle further configured to generate a disparity metric, the disparity metric comprising a measure of a disparity between the first data message and the second data message; and include the disparity metric in the aggregated data message.

A seventh aspect may include any of the first through sixth aspects wherein to aggregate the data message into an aggregated data message, wherein the master oracle is further configured to generate a combined message based on a concatenation of at least a portion of the first data message and at least a portion of the second data message, the combined message representative of the same event; and include the combined message in the aggregated data message.

An eighth aspects may include any of the first through seventh aspects, wherein the master oracle further includes a key management cache, wherein the master oracle is further configured to receive configuration parameters comprising the respective public keys for the oracles; and store the respective public keys in the key management cache.

A ninth aspect may include any of the first through eighth aspects, wherein to identify, in the oracle index repository, the plurality of oracle identifiers for the oracles, the master oracle is further configured to: generate a configuration request to an oracle management service, the configuration request comprising the oracle network identifier, a master oracle identifier, or any combination thereof; transmit the configuration request to the oracle management service, the oracle management service configured to identify the oracle identifiers, the respective public keys for the oracles, or any combination thereof; and receive, from the oracle management service, configuration parameters comprising the master oracle identifier, the oracle network identifier, the oracle identifiers, the respective public keys, or any combination thereof.

A tenth aspect may include may include any of the previous aspects, wherein the system further comprises a oracle management service and an oracle index repository, the oracle index repository comprising a plurality of oracle identifiers mapped to an oracle network identifier, the oracle network identifier representative of an oracle network and the oracle identifiers representative of oracles in the oracle network, wherein the oracles comprise a master oracle configured to aggregate data messages received from other oracles in the oracle network into an aggregated data message. The oracle index service may receive an oracle registration request; extract parameters from the oracle registration request, the parameters comprising a network identifier and a public key, register an oracle by: storing, in the oracle index repository, an oracle identifier for the oracle and the public key, mapping, in the oracle index repository, the oracle identifier to the oracle network identifier; receive a smart contract registration request, the smart contract registration request comprising the oracle network identifier for the oracle network; and select, from the oracle index repository, a master oracle identifier representative of the master oracle for the oracle network; and cause a participant node to receive the aggregated data message from the master oracle.

An eleventh aspect may include any of the previous aspects, wherein the oracle management service is further configured to access a registration criteria mapped to the network identifier; determine, based on the extracted parameters, the oracle registration request satisfies the registration criteria, wherein the oracle is registered in response to satisfaction of the registration criteria.

A twelfth aspect may include any of the previous aspects, wherein to wherein to cause a participant node to receive the aggregated data message from the master oracle, the oracle management service is further configured to: transmit, the participant node, the identifier of the master oracle and a public key of the master oracle.

A thirteenth aspect may include any of the previous aspects wherein to cause the participant node to receive the aggregated data message from the master oracle, the oracle management service is further configured to: transmit, to the master oracle, a configuration instruction that causes the master oracle to communicate the aggregated data messages to the participant node.

A fourteenth aspect may include any of the previous aspects wherein the oracle network comprises a plurality of master oracles, wherein to select the master oracle, the oracle management service is further configured to select the master oracle from the plurality of master oracle at random, or select the master oracle from the plurality of master oracles in response to the master oracle being in communication with a least amount of distributed ledger participants.

What is claimed is:

1. A system comprising:
   a processor, the processor configured to:
   receive an oracle network identifier, the oracle network identifier indicative of an oracle network, the oracle network comprising a plurality of oracles;
   identify a plurality of oracle identifiers for the oracles, the oracle identifiers stored in an oracle index repository and linked with the oracle network identifier in the oracle index repository;
   determine respective public keys for the oracles;
   receive data messages and digital signatures of the data messages, the digital signatures respectively generated by the oracles;
   verify, based on the respective public keys for the oracles, the digital signatures as being generated by the oracles, respectively;
   aggregate the data messages into an aggregated data message;
   generate a digital signature of the aggregated data message with a private key and public key pair, the public key being accessible to a participant node of a distributed ledger network; and
   transmit the aggregated data message and the digital signature to the participant node, the participant node comprising a blockchain, wherein the participant node is configured to verify the digital signature of the master oracle, and execute a smart contract stored on the blockchain in response to verification of the digital signature, wherein execution of the smart contract with the aggregated data causes the participant node to append result data to the blockchain.

2. The system of claim 1, wherein the processor is further configured to:
   include the digital signatures in the aggregated data message, wherein the participant node is further configured to verify the digital signatures based on the respective public keys for the oracles.

3. The system of claim 1, wherein the processor is further configured to:
   receive a data message from a data source, wherein the data source is separate from the oracles and not accessed by the oracles,
   wherein the aggregated data message is based on data messages received from the oracles and the data message received from the data source.

4. The system of claim 3, wherein the processor is further configured to:
   accumulate, in a data index repository, in response to receiving the data message from the data source, the data messages received from the oracles, wherein the data messages are respectively mapped to the oracle identifiers for the oracles in the data index repository,
   wherein the aggregated data message is based on the data message received from the oracles and the accumulated data messages.

5. The system of claim 3, wherein the processor is further configured to:
   generate, in response to receiving the data message from the data source, a list of oracles to receive data from;
   receive data from at least one of the oracles; and
   determine aggregation criteria is satisfied, wherein the aggregation criteria comprises at least one of:
   a condition that at least one of the oracles have provided data, or
   a condition that a predetermined time period has elapsed.

6. The system of claim 1, wherein the data messages comprise a first data message received from a first oracle and a second data message received from a second oracle, wherein the first data message and the second data message are descriptive of a same event, wherein to aggregate the data messages into an aggregated data message, the processor is further configured to:
   generate a disparity metric, the disparity metric comprising a measure of a disparity between the first data message and the second data message; and
   include the disparity metric in the aggregated data message.

7. The system of claim 5, wherein to aggregate the data message into an aggregated data message, the processor is further configured to:
   generate a combined message based on a concatenation of at least a portion of the first data message and at least a portion of the second data message, the combined message representative of the same event; and
   include the combined message in the aggregated data message.

8. The system of claim 1, further comprising a key management cache, wherein the processor is further configured to:
   receive configuration parameters comprising the respective public keys for the oracles; and
   store the respective public keys in the key management cache.

9. The system of claim 1, wherein to identify, in the oracle index repository, the plurality of oracle identifiers for the oracles, the processor is further configured to:
   generate a configuration request to an oracle management service, the configuration request comprising the oracle network identifier, a master oracle identifier, or any combination thereof;
   transmit the configuration request to the oracle management service, the oracle management service configured to identify the oracle identifiers, the respective public keys for the oracles, or any combination thereof; and
   receive, from the oracle management service, configuration parameters comprising the master oracle identifier, the oracle network identifier, the oracle identifiers, the respective public keys, or any combination thereof.

10. A method comprising:
receiving, by a master oracle of an oracle network, an oracle network identifier, the oracle network identifier indicative of the oracle network, the oracle network comprising a plurality of oracles;
identifying a plurality of oracle identifiers for the oracles, the oracle identifiers stored in an oracle index repository and linked with the oracle network identifier in the oracle index repository;
determining respective public keys for the oracles;
receiving data messages and digital signatures generated by the oracles;
verifying, based on the respective public keys for the oracles, the digital signatures are signed the oracles;
aggregating the data messages into an aggregated data message;
generating a digital signature of the aggregated data message based on a private key and public key pair for the master oracle, the public key being accessible to a participant node of a distributed ledger network; and
transmitting the aggregated data message and the digital signature to the participant node, the participant node comprising a blockchain, wherein the participant node is configured to verify the digital signature of the master oracle, and execute a smart contract stored on the blockchain, wherein execution of the smart contract causes result data, based on the aggregated data message, to be stored on the blockchain.

11. The method of claim 10, further comprising:
receiving, by the master oracle, a data message from a data source, wherein the data source is separate from the oracles and not accessed by the oracles; and
accumulating, in a data index repository, in response to receiving the data message from the data source, the data messages received from the oracles, wherein the data messages are respectively mapped to the oracle identifiers for the oracles in the data index repository, wherein the aggregated data message is based on the data message received from the oracles and the accumulated data messages.

12. The method of claim 10, further comprising:
including respective digital signatures in the aggregated data message, wherein the participant node is further configured to verify the respective digital signatures based on the respective public keys for the oracles.

13. The method of claim 10, wherein the data messages comprise a first data message received from a first oracle and a second data message received from a second oracle, wherein the first data message and the second data message are descriptive of a same event, wherein aggregating the data messages into an aggregated data message further comprises:
generating a disparity metric, the disparity metric comprising a measure of a disparity between the first data message and the second data message; and
generating a combined message based on a concatenation of the first data message and the second data message, the combined message representative of the same event; and
including the combined message and the disparity metric in the aggregated data message.

14. The method of claim 10, further comprising:
receiving configuration parameters comprising the respective public keys for the oracles; and
storing the respective public keys in a key management cache of the master oracle, wherein determining respective public keys for the oracles further comprises:
identifying, in the key management cache, the respective public keys for the oracles.

15. The method of claim 10, wherein identifying, in the oracle index repository, the plurality of oracle identifiers for the master oracle further comprises:
generating a configuration request to an oracle management service, the configuration request comprising the oracle network identifier, a master oracle identifier, or any combination thereof;
transmitting the configuration request to the oracle management service, the oracle management service configured to identify the oracle identifiers, the respective public keys for the oracles, or any combination thereof; and
receiving, from the oracle management service, configuration parameters comprising the oracle master identifier, the oracle network identifier, the oracle identifiers, the respective public keys, or any combination thereof.

16. A system comprising
an oracle index repository, the oracle index repository comprising a plurality of oracle identifiers mapped to an oracle network identifier, the oracle network identifier representative of an oracle network and the oracle identifiers representative of oracles in the oracle network, wherein the oracles comprise a master oracle configured to aggregate data messages received from other oracles in the oracle network into an aggregated data message,
a processor, the processor configured to:
receive an oracle registration request;
extract parameters from the oracle registration request, the parameters comprising a network identifier and a public key,
register an oracle by:
storing, in the oracle index repository, an oracle identifier for the oracle and the public key, and
mapping, in the oracle index repository, the oracle identifier to the oracle network identifier;
receive a smart contract registration request, the smart contract registration request comprising the oracle network identifier for the oracle network; and
select, from the oracle index repository, a master oracle identifier representative of the master oracle for the oracle network; and
cause a participant node to receive the aggregated data message from the master oracle.

17. The system of claim 16, wherein the processor is further configured to:
access a registration criteria mapped to the network identifier;
determine, based on the extracted parameters, the oracle registration request satisfies the registration criteria,
wherein the oracle is registered in response to satisfaction of the registration criteria.

18. The system of claim 16, wherein to cause the participant node to receive the aggregated data message from the master oracle, the processor is further configured to:
transmit, the participant node, the identifier of the master oracle and a public key of the master oracle.

19. The system of claim 16, wherein to cause the participant node to receive the aggregated data message from the master oracle, the processor is further configured to:
 transmit, to the master oracle, a configuration instruction that causes the master oracle to communicate the aggregated data messages to the participant node.

20. The system of claim 16, wherein the oracle network comprises a plurality of master oracles, wherein to select the master oracle, the processor is further configured to:
 select the master oracle from the plurality of master oracle at random, or
 select the master oracle from the plurality of master oracles in response to the master oracle being in communication with a least amount of distributed ledger participants.

\* \* \* \* \*